(12) United States Patent
Kwon

(10) Patent No.: US 11,915,336 B2
(45) Date of Patent: Feb. 27, 2024

(54) METHOD AND DEVICE FOR WATERMARK-BASED IMAGE INTEGRITY VERIFICATION

(71) Applicant: INDUSTRY-ACADEMIA COOPERATION GROUP OF SEJONG UNIVERSITY, Seoul (KR)

(72) Inventor: Oh Jin Kwon, Hanam-si (KR)

(73) Assignee: INDUSTRY-ACADEMIA COOPERATION GROUP OF SEJONG UNIVERSITY, Seoul (KR)

( * ) Notice: Subject to any disclaimer, the term of this patent is extended or adjusted under 35 U.S.C. 154(b) by 611 days.

(21) Appl. No.: 17/057,249

(22) PCT Filed: May 17, 2019

(86) PCT No.: PCT/KR2019/005890
§ 371 (c)(1),
(2) Date: Nov. 20, 2020

(87) PCT Pub. No.: WO2019/225903
PCT Pub. Date: Nov. 28, 2019

(65) Prior Publication Data
US 2021/0334931 A1 Oct. 28, 2021

(30) Foreign Application Priority Data

May 23, 2018 (KR) .......................... 10-2018-0058185

(51) Int. Cl.
*G06T 1/00* (2006.01)
*G06T 9/00* (2006.01)
(Continued)

(52) U.S. Cl.
CPC .......... *G06T 1/0057* (2013.01); *G06T 1/0092* (2013.01); *G06T 9/00* (2013.01); *H04N 19/174* (2014.11); *H04N 19/91* (2014.11)

(58) Field of Classification Search
CPC ....... G06T 1/0057; G06T 1/0092; G06T 9/00; G06T 1/005; G06T 2201/0052;
(Continued)

(56) References Cited

U.S. PATENT DOCUMENTS 7,707,422 B2    4/2010  Shin et al.
2004/0258243 A1* 12/2004 Shin ..................... H04N 19/61
                                                386/E5.001

(Continued)

FOREIGN PATENT DOCUMENTS

KR   10-2011-0047105 A       5/2011
KR       20130085264 A  *    1/2012  ........... H04N 19/625
(Continued)

*Primary Examiner* — Nay A Maung
*Assistant Examiner* — Vaisali Rao Koppolu
(74) *Attorney, Agent, or Firm* — Goldilocks Zone IP Law

(57) ABSTRACT

The present disclosure provides a method of embedding a watermark on a Joint Photographic Experts Group (JPEG) image. The method includes: performing an entropy decoding on the JPEG image to generate quantized discrete cosine transform (DCT) coefficients; determining target bits in a bit plane of the quantized DCT coefficients on the basis of a watermark-embedding table (WET); and embedding a watermark based on metadata of the JPEG image in the target bits. Also, the present disclosure provides a method of verifying integrity of the image by using the embedded watermark.

16 Claims, 13 Drawing Sheets

(51) Int. Cl.
*H04N 19/174* (2014.01)
*H04N 19/91* (2014.01)

(58) Field of Classification Search
CPC .......... G06T 2201/0065; H04N 19/174; H04N 19/91; H04N 19/467; H04N 19/625; G06F 21/64
See application file for complete search history.

(56) References Cited

U.S. PATENT DOCUMENTS

2008/0199093 A1* 8/2008 Shi .................. G06T 1/0057
382/232
2008/0273861 A1* 11/2008 Yang ................ H04N 17/004
386/259
2009/0067671 A1* 3/2009 Alattar .............. G06T 1/0028
382/100
2009/0116685 A1* 5/2009 Yoo ................. G06T 1/0028
382/100
2010/0177977 A1* 7/2010 Seshadri ........... H04N 19/467
382/248
2015/0347442 A1* 12/2015 Lawrence ......... G06F 16/1744
707/692

FOREIGN PATENT DOCUMENTS

KR    10-2014-0091081 A    7/2014
KR        10-1736229 B1    5/2017

* cited by examiner

FIG. 4

$q = 60$; $PSNR_{rec} = 34.332$

| $Y_{comp.}$ | $m=1$ | 2 | 3 | 4 | 5 | 6 |
|---|---|---|---|---|---|---|
| $p=1$ | 1.3869 | 0.5601 | 0.2070 | 0.0575 | 0.0088 | 0.0003 |
| 2 | | 1.8477 | 0.7539 | 0.2231 | 0.0353 | 0.0016 |
| 3 | | | 2.3131 | 0.7940 | 0.1347 | 0.0056 |
| 4 | | | | 2.3647 | 0.4883 | 0.0177 |
| 5 | | | | | 1.4971 | 0.0719 |
| 6 | | | | | | 0.1544 |

| $Cb_{comp.}$ | $m=1$ | 2 | 3 | 4 | 5 | 6 |
|---|---|---|---|---|---|---|
| $p=1$ | 0.1539 | 0.0254 | 0.0027 | 0.0001 | | |
| 2 | | 0.1004 | 0.0104 | 0.0003 | | |
| 3 | | | 0.0406 | 0.0013 | | |
| 4 | | | | 0.0050 | | |
| 5 | | | | | | |
| 6 | | | | | | |

| $Cr_{comp.}$ | $m=1$ | 2 | 3 | 4 | 5 | 6 |
|---|---|---|---|---|---|---|
| $p=1$ | 0.1484 | 0.0254 | 0.0029 | 0.0003 | | |
| 2 | | 0.1001 | 0.0116 | 0.0012 | | |
| 3 | | | 0.0460 | 0.0049 | | |
| 4 | | | | 0.0183 | | |
| 5 | | | | | | |
| 6 | | | | | | |

$q = 70$; $PSNR_{rec} = 35.280$

| $Y_{comp.}$ | $m=1$ | 2 | 3 | 4 | 5 | 6 |
|---|---|---|---|---|---|---|
| $p=1$ | 1.3718 | 0.5642 | 0.2233 | 0.0735 | 0.0156 | 0.0013 |
| 2 | | 1.8665 | 0.8073 | 0.2807 | 0.0605 | 0.0052 |
| 3 | | | 2.4611 | 0.9848 | 0.2336 | 0.0200 |
| 4 | | | | 2.8399 | 0.8255 | 0.0788 |
| 5 | | | | | 2.3681 | 0.2768 |
| 6 | | | | | | 0.7810 |

| $Cb_{comp.}$ | $m=1$ | 2 | 3 | 4 | 5 | 6 |
|---|---|---|---|---|---|---|
| $p=1$ | 0.1872 | 0.0360 | 0.0044 | 0.0003 | | |
| 2 | | 0.1411 | 0.0172 | 0.0012 | | |
| 3 | | | 0.0680 | 0.0047 | | |
| 4 | | | | 0.0177 | | |
| 5 | | | | | | |
| 6 | | | | | | |

| $Cr_{comp.}$ | $m=1$ | 2 | 3 | 4 | 5 | 6 |
|---|---|---|---|---|---|---|
| $p=1$ | 0.1751 | 0.0350 | 0.0050 | 0.0006 | 0.0000 | |
| 2 | | 0.1377 | 0.0194 | 0.0023 | 0.0001 | |
| 3 | | | 0.0761 | 0.0092 | 0.0005 | |
| 4 | | | | 0.0354 | 0.0019 | |
| 5 | | | | | 0.0070 | |
| 6 | | | | | | |

$q = 80$; $PSNR_{rec} = 36.583$

| $Y_{comp.}$ | $m=1$ | 2 | 3 | 4 | 5 | 6 |
|---|---|---|---|---|---|---|
| $p=1$ | 1.3682 | 0.5772 | 0.2390 | 0.0881 | 0.0244 | 0.0038 |
| 2 | | 1.8977 | 0.8618 | 0.3383 | 0.0987 | 0.0164 |
| 3 | | | 2.5877 | 1.1581 | 0.3688 | 0.0620 |
| 4 | | | | 3.2188 | 1.2362 | 0.2381 |
| 5 | | | | | 3.3258 | 0.8110 |
| 6 | | | | | | 2.2765 |

| $Cb_{comp.}$ | $m=1$ | 2 | 3 | 4 | 5 | 6 |
|---|---|---|---|---|---|---|
| $p=1$ | 0.2184 | 0.0498 | 0.0089 | 0.0010 | 0.0000 | |
| 2 | | 0.1950 | 0.0351 | 0.0037 | 0.0001 | |
| 3 | | | 0.1377 | 0.0147 | 0.0005 | |
| 4 | | | | 0.0570 | 0.0020 | |
| 5 | | | | | 0.0075 | |
| 6 | | | | | | |

| $Cr_{comp.}$ | $m=1$ | 2 | 3 | 4 | 5 | 6 |
|---|---|---|---|---|---|---|
| $p=1$ | 0.1982 | 0.0477 | 0.0088 | 0.0010 | 0.0001 | |
| 2 | | 0.1906 | 0.0352 | 0.0041 | 0.0005 | |
| 3 | | | 0.1378 | 0.0167 | 0.0020 | |
| 4 | | | | 0.0653 | 0.0075 | |
| 5 | | | | | 0.0287 | |
| 6 | | | | | | |

$q = 90$; $PSNR_{rec} = 38.925$

| $Y_{comp.}$ | $m=1$ | 2 | 3 | 4 | 5 | 6 |
|---|---|---|---|---|---|---|
| $p=1$ | 1.3271 | 0.5697 | 0.2447 | 0.1027 | 0.0382 | 0.0114 |
| 2 | | 1.8672 | 0.8818 | 0.3879 | 0.1494 | 0.0442 |
| 3 | | | 2.6434 | 1.3102 | 0.5498 | 0.1720 |
| 4 | | | | 3.5550 | 1.7353 | 0.6201 |
| 5 | | | | | 4.3513 | 1.9042 |
| 6 | | | | | | 4.6108 |

| $Cb_{comp.}$ | $m=1$ | 2 | 3 | 4 | 5 | 6 |
|---|---|---|---|---|---|---|
| $p=1$ | 0.3050 | 0.0800 | 0.0193 | 0.0031 | 0.0003 | |
| 2 | | 0.3135 | 0.0766 | 0.0126 | 0.0011 | |
| 3 | | | 0.2955 | 0.0497 | 0.0041 | |
| 4 | | | | 0.1934 | 0.0171 | |
| 5 | | | | | 0.0663 | |
| 6 | | | | | | |

| $Cr_{comp.}$ | $m=1$ | 2 | 3 | 4 | 5 | 6 |
|---|---|---|---|---|---|---|
| $p=1$ | 0.2563 | 0.0733 | 0.0187 | 0.0032 | 0.0004 | 0.0001 |
| 2 | | 0.2867 | 0.0750 | 0.0128 | 0.0017 | 0.0002 |
| 3 | | | 0.2900 | 0.0502 | 0.0068 | 0.0007 |
| 4 | | | | 0.1942 | 0.0266 | 0.0027 |
| 5 | | | | | 0.1039 | 0.0103 |
| 6 | | | | | | 0.0360 |

FIG. 5

FIG. 6 q = 60; PSNR_ipg = 32.991

$Y_{comp}$

| p\m | 1 | 2 | 3 | 4 | 5 | 6 |
|---|---|---|---|---|---|---|
| 1 | 1.0619 | 0.4159 | 0.1505 | 0.0412 | 0.0062 | 0.0003 |
| 2 |  | 1.4348 | 0.5651 | 0.1625 | 0.0250 | 0.0014 |
| 3 |  |  | 1.8218 | 0.5969 | 0.0978 | 0.0058 |
| 4 |  |  |  | 1.8688 | 0.3588 | 0.0178 |
| 5 |  |  |  |  | 1.1497 | 0.0734 |
| 6 |  |  |  |  |  | 0.1583 |

$Cb_{comp}$

| p\m | 1 | 2 | 3 | 4 | 5 | 6 |
|---|---|---|---|---|---|---|
| 1 | 0.1567 | 0.0283 | 0.0039 | 0.0003 |  |  |
| 2 |  | 0.1116 | 0.0144 | 0.0008 |  |  |
| 3 |  |  | 0.0579 | 0.0030 |  |  |
| 4 |  |  |  | 0.0111 |  |  |
| 5 |  |  |  |  |  |  |
| 6 |  |  |  |  |  |  |

$Cr_{comp}$

| p\m | 1 | 2 | 3 | 4 | 5 | 6 |
|---|---|---|---|---|---|---|
| 1 | 0.1471 | 0.0249 | 0.0037 | 0.0005 |  |  |
| 2 |  | 0.0972 | 0.0131 | 0.0016 |  |  |
| 3 |  |  | 0.0529 | 0.0071 |  |  |
| 4 |  |  |  | 0.0262 |  |  |
| 5 |  |  |  |  |  |  |
| 6 |  |  |  |  |  |  | q = 70; PSNR_ipg = 33.741

$Y_{comp}$

| p\m | 1 | 2 | 3 | 4 | 5 | 6 |
|---|---|---|---|---|---|---|
| 1 | 1.0068 | 0.3993 | 0.1546 | 0.0504 | 0.0102 | 0.0008 |
| 2 |  | 1.3911 | 0.5797 | 0.1967 | 0.0411 | 0.0037 |
| 3 |  |  | 1.8746 | 0.7140 | 0.1628 | 0.0152 |
| 4 |  |  |  | 2.1896 | 0.5878 | 0.0589 |
| 5 |  |  |  |  | 1.7952 | 0.2095 |
| 6 |  |  |  |  |  | 0.6152 |

$Cb_{comp}$

| p\m | 1 | 2 | 3 | 4 | 5 | 6 |
|---|---|---|---|---|---|---|
| 1 | 0.1785 | 0.0374 | 0.0065 | 0.0006 |  |  |
| 2 |  | 0.1437 | 0.0245 | 0.0022 |  |  |
| 3 |  |  | 0.0989 | 0.0089 |  |  |
| 4 |  |  |  | 0.0336 |  |  |
| 5 |  |  |  |  |  |  |
| 6 |  |  |  |  |  |  |

$Cr_{comp}$

| p\m | 1 | 2 | 3 | 4 | 5 | 6 |
|---|---|---|---|---|---|---|
| 1 | 0.1682 | 0.0317 | 0.0049 | 0.0006 | 0.0001 |  |
| 2 |  | 0.1278 | 0.0200 | 0.0028 | 0.0001 |  |
| 3 |  |  | 0.0772 | 0.0111 | 0.0007 |  |
| 4 |  |  |  | 0.0432 | 0.0021 |  |
| 5 |  |  |  |  | 0.0090 |  |
| 6 |  |  |  |  |  |  | q = 80; PSNR_ipg = 34.744

$Y_{comp}$

| p\m | 1 | 2 | 3 | 4 | 5 | 6 |
|---|---|---|---|---|---|---|
| 1 | 0.9409 | 0.3799 | 0.1535 | 0.0555 | 0.0155 | 0.0023 |
| 2 |  | 1.3318 | 0.5778 | 0.2198 | 0.0632 | 0.0101 |
| 3 |  |  | 1.8703 | 0.7889 | 0.2377 | 0.0389 |
| 4 |  |  |  | 2.3783 | 0.8420 | 0.1506 |
| 5 |  |  |  |  | 2.4669 | 0.5335 |
| 6 |  |  |  |  |  | 1.6188 |

$Cb_{comp}$

| p\m | 1 | 2 | 3 | 4 | 5 | 6 |
|---|---|---|---|---|---|---|
| 1 | 0.1897 | 0.0453 | 0.0090 | 0.0014 | 0.0000 |  |
| 2 |  | 0.1789 | 0.0356 | 0.0050 | 0.0002 |  |
| 3 |  |  | 0.1386 | 0.0192 | 0.0006 |  |
| 4 |  |  |  | 0.0751 | 0.0024 |  |
| 5 |  |  |  |  | 0.0096 |  |
| 6 |  |  |  |  |  |  |

$Cr_{comp}$

| p\m | 1 | 2 | 3 | 4 | 5 | 6 |
|---|---|---|---|---|---|---|
| 1 | 0.1800 | 0.0421 | 0.0081 | 0.0012 | 0.0001 |  |
| 2 |  | 0.1660 | 0.0312 | 0.0045 | 0.0006 |  |
| 3 |  |  | 0.1205 | 0.0186 | 0.0026 |  |
| 4 |  |  |  | 0.0723 | 0.0107 |  |
| 5 |  |  |  |  | 0.0383 |  |
| 6 |  |  |  |  |  |  | q = 90; PSNR_ipg = 36.513

$Y_{comp}$

| p\m | 1 | 2 | 3 | 4 | 5 | 6 |
|---|---|---|---|---|---|---|
| 1 | 0.8067 | 0.3322 | 0.1396 | 0.0575 | 0.0212 | 0.0062 |
| 2 |  | 1.1727 | 0.5241 | 0.2225 | 0.0836 | 0.0248 |
| 3 |  |  | 1.7312 | 0.8038 | 0.3196 | 0.0965 |
| 4 |  |  |  | 2.4257 | 1.0935 | 0.3617 |
| 5 |  |  |  |  | 3.0591 | 1.2109 |
| 6 |  |  |  |  |  | 3.2846 |

$Cb_{comp}$

| p\m | 1 | 2 | 3 | 4 | 5 | 6 |
|---|---|---|---|---|---|---|
| 1 | 0.2260 | 0.0607 | 0.0156 | 0.0027 | 0.0003 | 0.0000 |
| 2 |  | 0.2386 | 0.0632 | 0.0113 | 0.0016 | 0.0000 |
| 3 |  |  | 0.2457 | 0.0448 | 0.0064 | 0.0002 |
| 4 |  |  |  | 0.1765 | 0.0251 | 0.0007 |
| 5 |  |  |  |  | 0.0968 | 0.0027 |
| 6 |  |  |  |  |  | 0.0083 |

$Cr_{comp}$

| p\m | 1 | 2 | 3 | 4 | 5 | 6 |
|---|---|---|---|---|---|---|
| 1 | 0.2134 | 0.0585 | 0.0147 | 0.0025 | 0.0003 | 0.0001 |
| 2 |  | 0.2296 | 0.0583 | 0.0101 | 0.0013 | 0.0003 |
| 3 |  |  | 0.2264 | 0.0395 | 0.0052 | 0.0010 |
| 4 |  |  |  | 0.1550 | 0.0213 | 0.0041 |
| 5 |  |  |  |  | 0.0822 | 0.0144 |
| 6 |  |  |  |  |  | 0.0508 |

FIG. 7

| Y COMPONENT | | \textit{m} | | | | | |
|---|---|---|---|---|---|---|---|
| | | 1 | 2 | 3 | 4 | 5 | 6 |
| \textit{p} | 1 | | | ○ | ○ | ○ | ○ |
| | 2 | | | | | ○ | ○ |
| | 3 | | | | | | ○ |
| | 4 | | | | | | |
| | 5 | | | | | | |
| | 6 | | | | | | |

| Cb AND Cr COMPONENTS | | \textit{m} | | | | | |
|---|---|---|---|---|---|---|---|
| | | 1 | 2 | 3 | 4 | 5 | 6 |
| \textit{p} | 1 | | | ○ | ○ | ○ | ○ |
| | 2 | | | | ○ | ○ | ○ |
| | 3 | | | | | ○ | ○ |
| | 4 | | | | | | ○ |
| | 5 | | | | | | |
| | 6 | | | | | | |

Quality factor 60

Quality factor 90

FIG. 11

| TAMPERING TYPE | TAMPERED IMAGE | DETECTION RESULT |
|---|---|---|
| WATERMARKED JPEG IMAGE | | |
| METADATA | | |
| ENLARGEMENT | | |
| REDUCTION | | |
| RESIZING | | |
| CUTTING | | |
| RECOMPRESSION, SHARPENING, ENHANCEMENT, AND BLUR REMOVAL | | |
| COPY AND MOVE, REGIONAL COPYING, AND STITCHING | | |
| BLOCK EXCHANGE | | |
| COLLAGE ATTACK | | |

METHOD AND DEVICE FOR WATERMARK-BASED IMAGE INTEGRITY VERIFICATION

CROSS-REFERENCE TO RELATED APPLICATION

The present application is U.S. National Phase application under 35 U.S.C. § 371 of an International application No. PCT/KR2019/005890 filed on May 17, 2019, which is based on and claims the benefit of convention priority to Korean Patent Application No. 10-2018-0058185, filed on May 23, 2018 in the Korean Intellectual Property Office, the disclosure of which is incorporated by reference herein in its entirety.

TECHNICAL FIELD

The present disclosure relates to a method and device for verifying integrity of an image based on a watermark and, more particularly, to a method and device for embedding a watermark in a Joint Photographic Experts Group (JPEG) image file and verifying the integrity of the JPEG image based on the watermark.

BACKGROUND

Due to the expansion of Internet users, billions of digital images are generated a day and shared through social media. Most of the digital images may have a Joint Photographic Experts Group (JPEG) compressed file format. However, the JPEG files are vulnerable to a forgery and tampering.

As the keywords of personal information protection and security have been emerging, schemes for verifying integrity of the JPEG files are being introduced to overcome the above-mentioned disadvantages. The schemes for verifying the integrity of the image may be broadly categorized into a passive scheme and an active scheme, and the active scheme may be divided again into a signature-based scheme and a watermark-based scheme. Thus, the schemes for verifying the integrity of the image may be generally divided into three types.

The passive scheme detects clues that impair a statistical consistency of the image such as lighting, lens reflection distortion, chromatic aberration, sensor pattern noise, dust pattern, color filter arrangement, pixel-to-pixel correlation, and JPEG compression distortion. The passive scheme, however, has a drawback that a verification error is higher than other schemes.

The signature-based scheme may involve an extraction of a signature, from an original image, which is a set of features of the original image and has a data size much smaller than that of the original image. The set of features may have unique characteristics of the original image and may be stored as a file. Verification may be performed by comparing a signature of the original image with a signature of an object image. However, the signature-based scheme does not allow to identify a tampered region in the image.

The watermark-based scheme involves an embedding of a watermark into the original image. The watermark is a set of bits similar to an invisible noise but is sensitive to am alternation of the image, and the verification may be performed by checking the presence of the watermark in the image. Though the original image needs to be changed according to the watermark-based scheme, the change is invisible and can be ignored by human eyes. Accordingly, the watermark-based schemes are attracting attentions and are constantly being studied as a method of verifying the integrity of the JPEG file.

SUMMARY

Provided is a method of embedding a watermark in an image.

Provided is a method of verifying integrity of an image based on the watermark.

Provided is a device for embedding the watermark in the image.

Provided is a device for verifying integrity of the image based on the watermark.

Additional aspects will be set forth in part in the description which follows and, in part, will be apparent from the description, or may be learned by practice of the presented exemplary embodiments.

According to an aspect of an embodiment, a method of embedding a watermark in a Joint Photographic Experts Group (JPEG) image for verifying integrity of the JPEG image, includes: performing an entropy decoding on the JPEG image to generate quantized discrete cosine transform (DCT) coefficients; determining target bits in a bit plane of the quantized DCT coefficients on the basis of a watermark-embedding table (WET); and embedding a watermark based on metadata of the JPEG image in the target bits.

The method may further include: determining the WET on the basis of a peak signal-to-noise ratio (PSNR) value between an original raw image of a sample and a JPEG image of the sample and a PSNR value between the original raw image of the sample and a flipped JPEG image of the sample or a JPEG image of the sample to which random noise is added. The flipped JPEG image of the sample and the JPEG image of the sample to which random noise is added may mean the JPEG image of the sample to which the target bits in a bit plane of the quantized DCT coefficients are flipped and the JPEG image of the sample to which random noise is added in the target bits in a bit plane of the quantized DCT coefficients, respectively.

The operation of determining the WET may include: calculating a first PSNR value between the original raw image of the sample and the JPEG image of the sample; calculating a second PSNR value between the original raw image of the sample and the flipped JPEG image of the sample or the JPEG image of the sample to which the random noise is added; calculating a difference between the first PSNR value and the second PSNR value; and determining the WET on the basis of the difference and the second PSNR value.

The operation of determining the WET may further include: selecting at least one of the DCT coefficients on the basis of absolute values of the quantized DCT coefficients to generate the flipped JPEG image of the sample or the JPEG image of the sample to which the random noise is added.

The method may further include: determining the WET on the basis of an objective image quality metric between an original raw image of a sample and a JPEG image of the sample and an objective image quality metric between the original raw image of the sample and a flipped JPEG image of the sample or a JPEG image of the sample to which random noise is added.

The objective image quality metric may be calculated using at least one of structural similarity index measure (SSIM), Visual Information Fidelity (VIF), mean relative squared error (MRSE)-based signal-to-noise (SNR), weighted spherical-peak signal-to-noise ratio (WS-PSNR), and high dynamic range-visual difference predictor (HDR-VDP).

The method may further include: generating a plurality of groups of blocks (GOBs) having a tree structure and including the target bits on the basis of a plurality of blocks including the quantized DCT coefficients.

The operation of generating the plurality of GOBs having the tree structure and including the target bits on the basis of the plurality of blocks may include: setting the plurality of blocks as a mother GOB; dividing the mother GOB into a plurality of child GOBs as long as one child GOB includes a preset number or more of target bits; and generating branch chain information for each child GOB from the mother GOB to the child GOB.

The operation of embedding the watermark based on the metadata of the JPEG image in the target bits may include: generating a block identifying key (BIK) for each child GOB on the basis of child GOB information comprising information about bits that are not included in the target bits in the child GOBs and the branch chain information of the child GOB, the metadata of the JPEG image, and a user key; generating a random bit sequence (RBS) for each child GOB on the basis of the BIK for each child GOB; and embedding the RBS for each child GOB in the target bits of the GOB.

The child GOB information may further include: information about bits that are not included in target bits in a neighboring GOB of the child GOB; and branch chain information of the neighboring GOB of the child GOB.

According to another aspect of an embodiment, a method of verifying integrity of a Joint Photographic Experts Group (JPEG) image in which a watermark is embedded, includes: performing an entropy decoding on the JPEG image to generate quantized discrete cosine transform (DCT) coefficients; determining target bits in a bit plane of the quantized DCT coefficients on the basis of a watermark-embedding table (WET); extracting a first watermark from the target bits; generating a second watermark on the basis of metadata of the JPEG image; and comparing the first watermark with the second watermark to verify the integrity of the image.

The method may further include: generating a plurality of groups of blocks (GOBs) having a tree structure and including the target bits on the basis of a plurality of blocks including the quantized DCT coefficients.

The operation of generating the plurality of GOBs having the tree structure and including the target bits on the basis of the plurality of blocks may include: setting the plurality of blocks as a mother GOB; dividing the mother GOB into a plurality of child GOBs as long as one child GOB includes a preset number or more of target bits; and generating branch chain information for each child GOB from the mother GOB to the child GOB.

The operation of extracting the first watermark from the target bits may include: extracting the first watermark from the target bits for each child GOB.

The operation of generating the second watermark on the basis of the metadata of the JPEG image may include: generating a block identifying key (BIK) for each child GOB on the basis of the child GOB information including information about bits that are not included in the target bits in the child GOBs and the branch chain information of the child GOB, the metadata of the JPEG image, and a user key; and generating a random bit sequence (RBS) for each child GOB as the second watermark on the basis of the BIK for each child GOB.

The operation of comparing the first watermark with the second watermark to verify the integrity of the image may include: determining the JPEG image as having been unaltered when the first watermark for the child GOB is the same as the second watermark for the child GOB for all the child GOBs; and determining the JPEG image as having been altered when the first watermark for the child GOB is not the same as the second watermark for the child GOB for any of the child GOBs.

The operation of determining the JPEG image as having been altered further may include: determining the child GOB of which the first watermark is not the same as the second watermark as an altered region.

According to an aspect of another embodiment, a device for embedding a watermark in a Joint Photographic Experts Group (JPEG) image for verifying integrity of the JPEG image, includes: a processor; and a memory storing at least one instruction to be executed by the processor. When executed by the processor, the at least one instruction causes the processor to: perform an entropy decoding on the JPEG image to generate quantized discrete cosine transform (DCT) coefficients; determine target bits in a bit plane of the quantized DCT coefficients on the basis of a watermark-embedding table (WET); and embed a watermark based on metadata of the JPEG image in the target bits.

The at least one instruction may further cause the processor to: determine the WET on the basis of a peak signal-to-noise ratio (PSNR) value between an original raw image of a sample and a JPEG image of the sample and a PSNR value between the original raw image of the sample and a flipped JPEG image of the sample or a JPEG image of the sample to which random noise is added.

The at least one instruction may further cause the processor to: calculate a first PSNR value between the original raw image of the sample and the JPEG image of the sample; calculate a second PSNR value between the original raw image of the sample and the flipped JPEG image of the sample or the JPEG image of the sample to which the random noise is added; calculate a difference between the first PSNR value and the second PSNR value; and determine the WET on the basis of the difference and the second PSNR value.

The at least one instruction may further cause the processor to: select at least one of the DCT coefficients on the basis of absolute values of the quantized DCT coefficients to generate the flipped JPEG image of the sample or the JPEG image of the sample to which the random noise is added.

The at least one instruction may further cause the processor to: determine the WET on the basis of an objective image quality metric between an original raw image of a sample and a JPEG image of the sample and an objective image quality metric between the original raw image of the sample and a flipped JPEG image of the sample or a JPEG image of the sample to which random noise is added.

The objective image quality metric may be calculated using at least one of structural similarity index measure (SSIM), Visual Information Fidelity (VIF), mean relative squared error (MRSE)-based signal-to-noise (SNR), weighted spherical-peak signal-to-noise ratio (WS-PSNR), and high dynamic range-visual difference predictor (HDR-VDP).

The at least one instruction may further cause the processor to: generate a plurality of groups of blocks (GOBs) having a tree structure and including the target bits on the basis of a plurality of blocks including the quantized DCT coefficients.

The at least one instruction may further cause the processor to: set the plurality of blocks as a mother GOB; divide the mother GOB into a plurality of child GOBs as long as one child GOB includes a preset number or more of target bits; and generate branch chain information for each child GOB from the mother GOB to the child GOB.

The at least one instruction may further cause the processor to: generate a block identifying key (BIK) for each child GOB on the basis of child GOB information comprising information about bits that are not included in the target bits in the child GOB s and the branch chain information of the child GOB, the metadata of the JPEG image, and a user key; generate a random bit sequence (RBS) for each child GOB on the basis of the BIK for each child GOB; and embed the RBS for each child GOB in the target bits of the GOB.

The child GOB information may further include: information about bits that are not included in target bits in a neighboring GOB of the child GOB; and branch chain information of the neighboring GOB of the child GOB.

According to another aspect of another embodiment, a device for verifying integrity of an image includes: a processor; and a memory storing at least one instruction to be executed by the processor. When executed by the processor, the at least one instruction causes the processor to: perform an entropy decoding on a Joint Photographic Experts Group (JPEG) image to generate quantized discrete cosine transform (DCT) coefficients; determine target bits in a bit plane of the quantized DCT coefficients on the basis of a watermark-embedding table (WET); extract a first watermark from the target bits; generate a second watermark on the basis of metadata of the JPEG image; and compare the first watermark with the second watermark to verify the integrity of the image.

The at least one instruction may further cause the processor to: generate a plurality of groups of blocks (GOBs) having a tree structure and including the target bits on the basis of a plurality of blocks including the quantized DCT coefficients.

The at least one instruction may further cause the processor to: set the plurality of blocks as a mother GOB; divide the mother GOB into a plurality of child GOBs as long as one child GOB includes a preset number or more of target bits; and generate branch chain information for each child GOB from the mother GOB to the child GOB.

The at least one instruction may further cause the processor to: extract the first watermark from the target bits for each child GOB.

The at least one instruction may further cause the processor to: generate a block identifying key (BIK) for each child GOB on the basis of the child GOB information including information about bits that are not included in the target bits in the child GOB s and the branch chain information of the child GOB, the metadata of the JPEG image, and a user key; and generate a random bit sequence (RBS) for each child GOB as the second watermark on the basis of the BIK for each child GOB.

The at least one instruction may further cause the processor to: determine the JPEG image as having been unaltered when the first watermark for the child GOB is the same as the second watermark for the child GOB for all the child GOBs; and determine the JPEG image as having been altered when the first watermark for the child GOB is not the same as the second watermark for the child GOB for any of the child GOBs.

The at least one instruction may further cause the processor to: determine the child GOB of which the first watermark is not the same as the second watermark as an altered region.

The present disclosure enables to provide a user with a digital image file faithful to personal information protection and conforming to a security policy by verifying integrity of a JPEG image.

The present disclosure allows to detect a collage attack on the JPEG image and a malicious tampering of the JPEG image as well as a benign alteration of the image.

In case that the JPEG image have been altered, the present disclosure can identify an altered region in the JPEG image and inform the user of the altered region.

The present disclosure may enhance a probability of detecting a forgery and tampering of the JPEG image to almost 100% without additional signature information.

BRIEF DESCRIPTION OF THE DRAWINGS

In order that the disclosure may be well understood, there will now be described various forms thereof, given by way of example, reference being made to the accompanying drawings, in which:

FIG. 4 illustrates tables containing first data suitable for use in determining target bits for embedding a watermark according to an embodiment of the present disclosure;

FIG. 5 illustrates tables containing second data suitable for use in determining target bits for embedding the watermark according to an embodiment of the present disclosure;

FIG. 6 illustrates tables containing third data suitable for use in determining target bits for embedding the watermark according to an embodiment of the present disclosure;

FIG. 7 is a table showing target bits for embedding the watermark in a bit plane of discrete cosine transform (DCT) coefficients determined based on the first through third data according to an embodiment of the present disclosure;

FIG. 11 is a table summarizing results of detecting tampered regions from a watermarked image according to an embodiment of the present disclosure;

DETAILED DESCRIPTION

Figure 1:
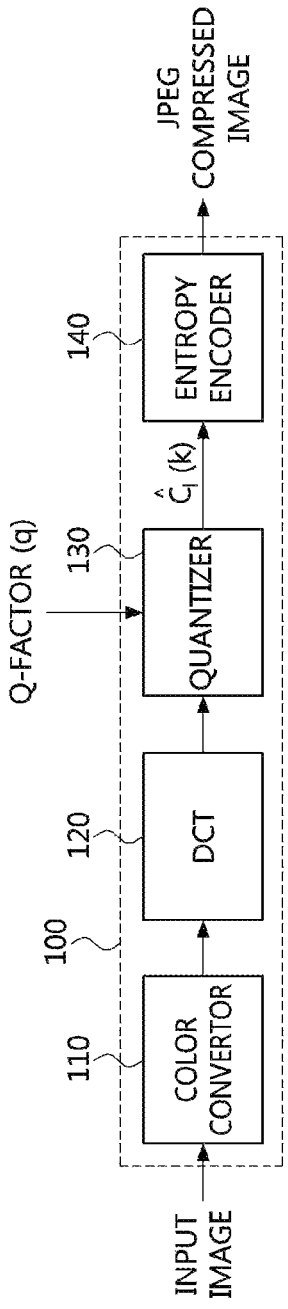
FIG. 1 is a block diagram of a Joint Photographic Experts Group (JPEG) image encoding device.

While the present disclosure is susceptible to various modifications and alternative forms, specific embodiments thereof are shown by way of example in the accompanying drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element without departing from the scope of the present disclosure. As used herein, the term "and/or" includes any one or combination of the associated listed items.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting to the present disclosure. As used herein, the singular forms "a" and "an" are intended to include the plural forms as well, unless the context clearly indicates otherwise. It will be further understood that the terms "comprise," "comprising," "include," and/or "including," when used herein, specify the presence of stated features, integers, steps, operations, elements, and/or components but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to the accompanying drawings. In order to facilitate overall understanding of the present disclosure, like reference numerals in the drawings denote like elements, and thus the description thereof will not be repeated. Hereinafter, embodiments of the present disclosure will be described in detail with reference to the accompanying drawings.

FIG. 1 is a block diagram of a Joint Photographic Experts Group (JPEG) image encoding device.

Referring to FIG. 1, a JPEG image encoding device 100 may compress an input image into a JPEG format to output a compressed image and may be referred to as a JPEG encoder. The JPEG image encoding device 100 may generally include a color convertor 110, a discrete cosine transform (DCT) unit 120, a quantizer 130, and an entropy encoder 140.

The color convertor 110 may convert a color space of an image from one expressed by red-green-blue (RGB) values into another one expressed by YCbCr values. Here, 'Y' may denote a luminance component, and 'Cb' and 'Cr' may denote blue-difference and red-difference chroma components, respectively. The Cb-component and Cr-component may be selectively subsampled. A sampling format for the YCbCr signal or the subsampling format for the chroma difference components may be one of 4:4:4, 4:2:2, and 4:2:0.

The DCT unit 120 may perform 8×8 block-based DCT operations on image data expressed in the YCbCr color space. The 8×8 block-based DCT operations may be performed on each of the Y, Cb, and Cr components. Here, the DCT operation is one of methods commonly used for describing an image in a frequency domain. In detail, the DCT operation converts the image data in a spatial domain into the image data in the frequency domain using cosine bases and yields DCT coefficients as a result. The DCT coefficients may include a direct current (DC) coefficient (i.e., average component coefficient) and alternating current (AC) coefficients (i.e., high-frequency component coefficients), and the DCT coefficients may be re-arranged into a one-dimensional vector by a zigzag ordering.

The quantizer 130 may receive the DCT coefficients from the DCT unit 120 to map each of the coefficients to a discrete value to obtain quantized DCT coefficients. The quantization performed by the quantizer 130 may cause a lossy compression, and each of contiguous or large amounts of input data may be mapped into a few discrete symbols after the quantization. A compression ratio may be controlled by an input parameter referred to as a quality factor (Q-factor). The Q-factor may be referred to as an image quality factor or a quantization parameter, but the present disclosure is not limited thereto.

In FIG. 1, $\hat{C}_l(k)$ may denote a k-th quantized DCT coefficient in an l-th block among all the 8×8 blocks of the input image. The one-dimensional index 'l' may be used to indicate a block in a two-dimensional space. The index 'l' may be an integer greater than or equal to zero and less than 'L', where 'L' may be a total number of 8×8 blocks in the input image. Another index 'k' may be an integer greater than or equal to zero and less than or equal to 63. The coefficient $\hat{C}_l(k)$ may be referred to as the DC coefficient in the case that 'k' is zero, while the coefficient $\hat{C}_l(k)$ may be referred to as the AC coefficient in the case that 'k' is not zero.

The entropy encoder 140 may receive the quantized DCT coefficients from the quantizer 130 and perform an entropy encoding for the quantized DCT coefficients to obtain a compressed image of a JPEG format. The entropy coding performed by the entropy encoder 140 may correspond to a lossless compression, and may minimize an amount of data representing encoded data by adaptively adjusting a length of a symbol according to a probability of occurrence of the symbol.

Figure 2:
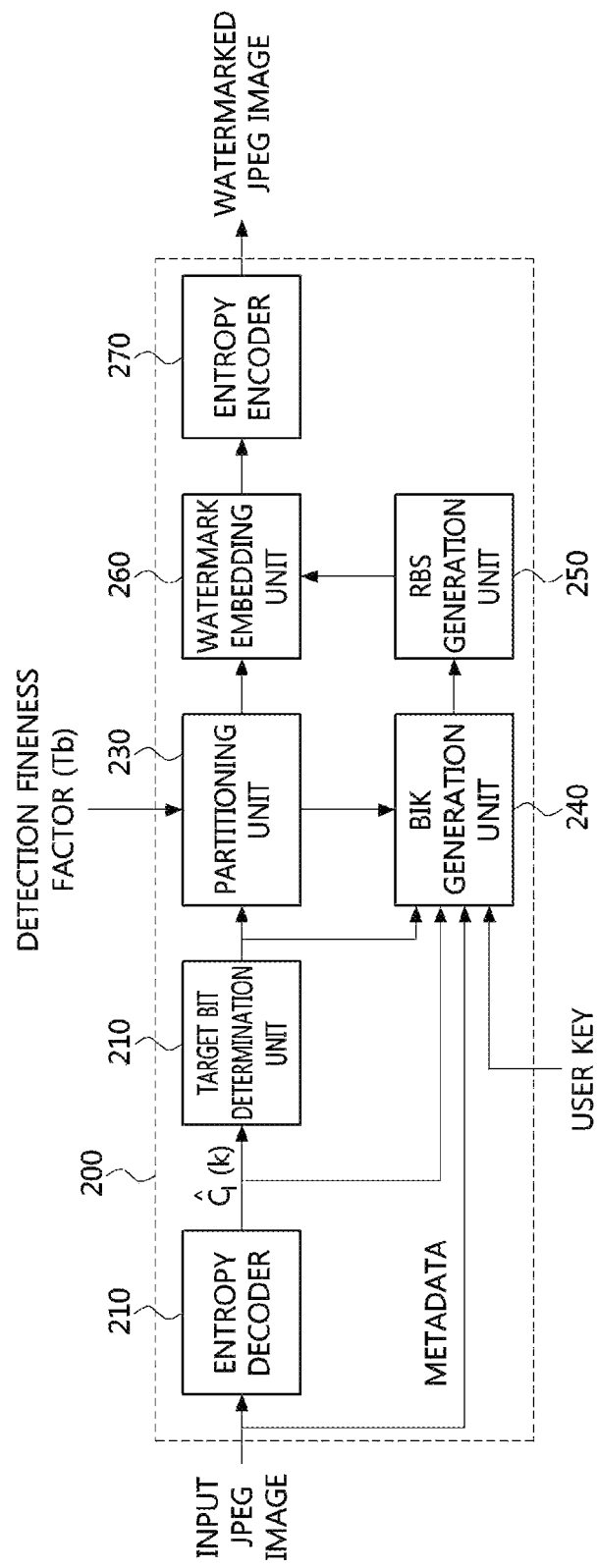
FIG. 2 is a block diagram of a watermark embedding device according to an embodiment of the present disclosure.

FIG. 2 is a block diagram of a watermark embedding device according to an embodiment of the present disclosure.

Referring to FIG. 2, a watermark embedding device 200 according to an embodiment of the present disclosure may include an entropy decoder 210, a target bit determination unit 220, a partitioning unit 230, a block identifying key (BIK) generation unit 240, a random bit sequence (RBS) generation unit 250, a watermark embedding unit 260, and an entropy encoder 270. Here, physical implementations of the components of the watermark embedding device 200 defined herein based on their functions, are not limited to their names. A plurality of functions may be implemented by a single component and, to the contrary, a single function may be implemented by a plurality of components.

The watermark embedding device 200 according to the embodiment may be added into an existing JPEG encoder, may be implemented in a form of software that may be executed by a processor to perform the functions, or may be implemented as a device separate from the JPEG encoder and connected to the JPEG encoder. However, the present disclosure is not limited thereto.

The watermark embedding device 200 according to the embodiment of the present disclosure may embed a watermark in the quantized DCT coefficients. The embedded watermark may be extracted without loss by an image integrity verification device, when an integrity of the image is to be verified, as long as the image is not tampered.

The entropy decoder 210 may perform an entropy decoding for an input JPEG-compressed image. In other words, the entropy decoder 210 may decode the JPEG image entropy-encoded by the JPEG image encoding device. The entropy decoder 210 may be said to perform an inverse operation of the operation performed by the entropy encoder described with reference to FIG. 1. Thus, the entropy decoder 210 may restore and output the quantized DCT coefficients $\hat{C}_f(k)$ from the JPEG image.

The target bit determination unit 220 may determine target bits for embedding a watermark among the quantized DCT coefficients obtained by the entropy decoder 210. The target bit determination unit 220 may determine the target bits for embedding the watermark in a bit plane of the AC coefficients including bit positions from a least significant bit (LSB) to a most significant bit (MSB) on the basis of a watermark-embedding table (WET). The determination of the bit positions to embed the watermark bits may be important for a design of a more advanced watermark-based system, and a detailed description thereof will be described below with reference to FIGS. 4 to 7.

The partitioning unit 230 may partition or divide all the 8×8 DCT block sets into groups of blocks (GOBs) having a tree structure. The partitioning unit 230 may generate and store information about a branch chain from a root to a current GOB through partitioning process. Here, the partitioning unit 230 may continue to partition the GOBs so that each GOB includes Tb or more of target bits, where 'Tb' is a detection fineness factor. In other words, the partitioning unit 230 may set all the 8×8 DCT block sets as one mother GOB (i.e., root), divide the mother GOB into a plurality of child GOBs, and continue to divide the child GOB as long as each of the resultant GOBs includes at least Tb target bits. The detection fineness factor Tb may denote an input parameter that may be input to the partitioning unit 230 to determine a degree of division. The detection fineness factor Tb may determine a size of the GOB and the watermark embedded in the GOB. A detailed description of the detection fineness factor Tb will be provided below with reference to FIG. 8.

The use of a large-sized watermark may enhance a performance of detecting a forgery and tampering of the image but may degrade a quality of the watermarked image. That is, the size of the watermark and the quality of the watermarked image may have a trade-off relationship, and a parameter determining the trade-off relationship may be the detection fineness factor Tb.

The BIK generation unit 240 may generate a BIK on the basis of a user key, metadata of the input JPEG image, information about all bits that are not determined as the target bits in the GOB among the DCT coefficients according to the outputs of the entropy decoder 210 and the target bit determination unit 220, and information about the branch chain from the mother GOB to the GOB generated by the partitioning unit 230. Here, the information about all of the bits that are not determined as the target bits of the GOB and the information about the branch chain from the mother GOB to the GOB may be referred to as GOB information or child GOB information and may be generated for each GOB.

The BIK generation unit 240 may further include, in the child GOB information, the information about bits that are not determined as the target bits in a neighboring GOB of the child GOB and the branch chain information of the neighboring GOB of the child GOB to generate the BIK on the basis of the BIK on the basis of the child GOB information.

While generating the BIK, the BIK generation unit 240 may apply a hash function to the user key, the metadata of the input JPEG image, and the child GOB information. The hash function may be a SHA-512 algorithm, but the present disclosure is not limited thereto. Further, a user may set a BIK generation scheme such that the BIK may be generated independently for each block.

The hash function may refer to a one-way function that abbreviates data of an arbitrary length to data having a fixed length and has properties of first preimage resistance, second preimage resistance, and collision resistance.

The RBS generation unit 250 may generate an RBS, which is a watermark to be embedded in the target bits, on the basis of the BIK generated by the BIK generation unit 240. Since the BIK may be generated differently for each GOB, the RBS may be generated differently for each GOB also.

The watermark embedding unit 260 may embed the watermark generated by the RBS generation unit 250 in the target bits of each GOB. In other words, the watermark embedding unit 260 may embed the RBS for each GOB in the target bits of the GOB.

After the watermark is embedded for all of the GOBs by the watermark embedding unit 260, the entropy encoder 270 may perform the entropy encoding on the DCT coefficients in which the watermark is embedded to and output a watermarked JPEG image. Here, the entropy encoder 270 may perform the same function as the entropy encoder 140 described above with reference to FIG. 1, but the present disclosure is not limited thereto.

According to the embodiment of the present disclosure, the watermark embedding device 200 may embed the watermark in all of the GOBs to enable a device for verifying integrity of an image which will be described below to detect a benign alteration of image such as an enlargement, reduction, resizing, cutting, recompression, sharpening, enhancement, blur removal, or the like and to detect malicious tampering of the image such as a copy and move, regional copying, stitching, composition, or block exchange as well as a modification of metadata of the JPEG image.

The watermark embedding device 200 according to the embodiment of the present disclosure may include at least one processor and a memory that stores at least one instruction to be executed by the processor to perform the above-described operations. The processor which executes program commands or instructions stored in the memory may be implemented by a central processing unit (CPU), a graphics processing unit (GPU), or a dedicated processor suitable for performing the methods according to the present disclosure. The memory may include a volatile storage medium and/or a non-volatile storage medium. For example, the memory may include a read-only memory (ROM) and/or a random access memory (RAM).

Figure 3:
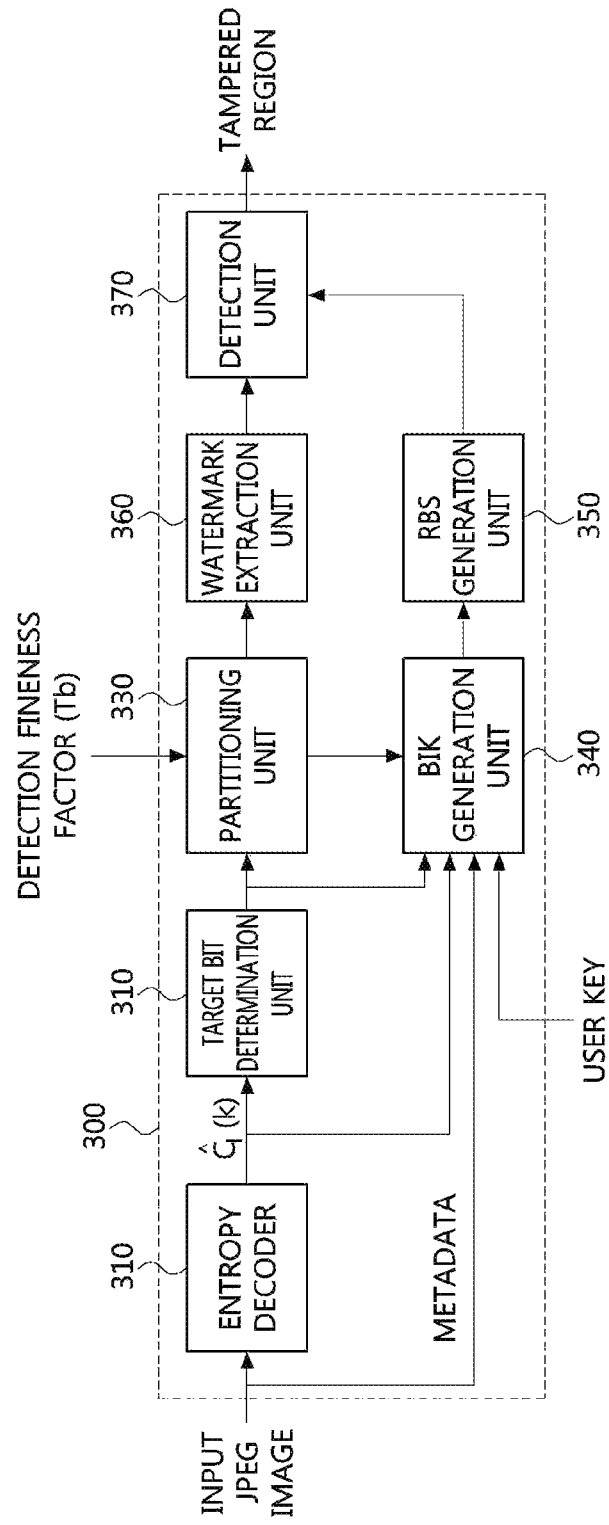
FIG. 3 is a block diagram of a device for verifying integrity of an image based on a watermark according to an embodiment of the present disclosure.

FIG. 3 is a block diagram of the device for verifying integrity of an image based on the watermark according to an embodiment of the present disclosure.

Referring to FIG. 3, the device 300 for verifying integrity of an image according to the embodiment of the present disclosure may include an entropy decoder 310, a target bit determination unit 320, a partitioning unit 330, a BIK generation unit 340, an RBS generation unit 350, a watermark extraction unit 360, and a detection unit 370. Here, physical implementations of the components of the device 300 for verifying the integrity of the image defined herein based on their functions, are not limited to their names. A plurality of functions may be implemented by a single component and, to the contrary, a single function may be implemented by a plurality of components.

Further, the device 300 for verifying the integrity of the image according to the embodiment of the present disclosure may be present in conjunction with the watermark embedding device 200 according to the embodiment of the present disclosure described with reference to FIG. 2. The device 300 for verifying the integrity of the image may be an independent device separate from the watermark embedding device 200, but the present disclosure is not limited thereto.

The entropy decoder 310, the target bit determination unit 320, the partitioning unit 330, the BIK generation unit 340, and the RBS generation unit 350 may perform the same functions as the entropy decoder 210, the target bit determination unit 220, the partitioning unit 230, the BIK generation unit 240, and the RBS generation unit 250 of the watermark embedding device 200 described with reference to FIG. 2.

The watermark extraction unit 360 may extract the RBS from the target bits of each GOB acquired by the target bit determination unit 320 and the partitioning unit 330. The RBS extracted by the watermark extraction unit 360 may be a watermark and, in particular, may be the watermark embedded by the watermark embedding device 200. The watermark extracted by the watermark extraction unit 360 may be referred to as a first watermark to distinguish from a watermark to be described below.

The detection unit 370 may compare the RBS (i.e., the first watermark) extracted by the watermark extraction unit 360 with an RBS (hereinbelow, referred to as "second watermark") generated by the RBS generation unit 350 for each GOB. In case that it is determined that the first watermark is the same as the second watermark for all of the GOBs, the detection unit 370 may determine that the JPEG image is not tampered. However, when it is determined that the first watermark is different from the second watermark in any one of the GOBs, the detection unit 370 may determine that the JPEG image is tampered and determine the GOB as a tampered region.

The probability that the first watermark coincides with the second watermark by a chance in the detection unit 370 is negligibly small. More specifically, assuming that the number of target bits extracted from each of the GOBs is N_GOB, the probability that the first watermark coincides with the second watermark by a chance may be $2^{-N\_GOB}$, which has a magnitude enough to be ignored when the N_GOB is sufficiently large.

Further, since the BIK which is the basis of the RBS may be generated for each GOB on the basis of the branch chain from the root to the current GOB, all the bits of the DCT coefficients that are not determined as the target bits of the GOB, the metadata of the input JPEG image, and the user key as described above with reference to FIG. 2, the device 300 for verifying the integrity of the image may detect both of the benign alteration and the malicious tampering of the image by use of all or some of the above-described information.

The device 300 for verifying the integrity of the image according to the embodiment of the present disclosure may include at least one processor and a memory that stores at least one instruction to be executed by the processor to perform the above-described operations. The processor which executes program commands or instructions stored in the memory may be implemented by a central processing unit (CPU), a graphics processing unit (GPU), or a dedicated processor suitable for performing the methods according to the present disclosure. The memory may include a volatile storage medium and/or a non-volatile storage medium. For example, the memory may include a read-only memory (ROM) and/or a random access memory (RAM).

FIG. 4 illustrates tables containing first data suitable for use in determining the target bits for embedding the watermark according to an embodiment of the present disclosure.

Figure 5:
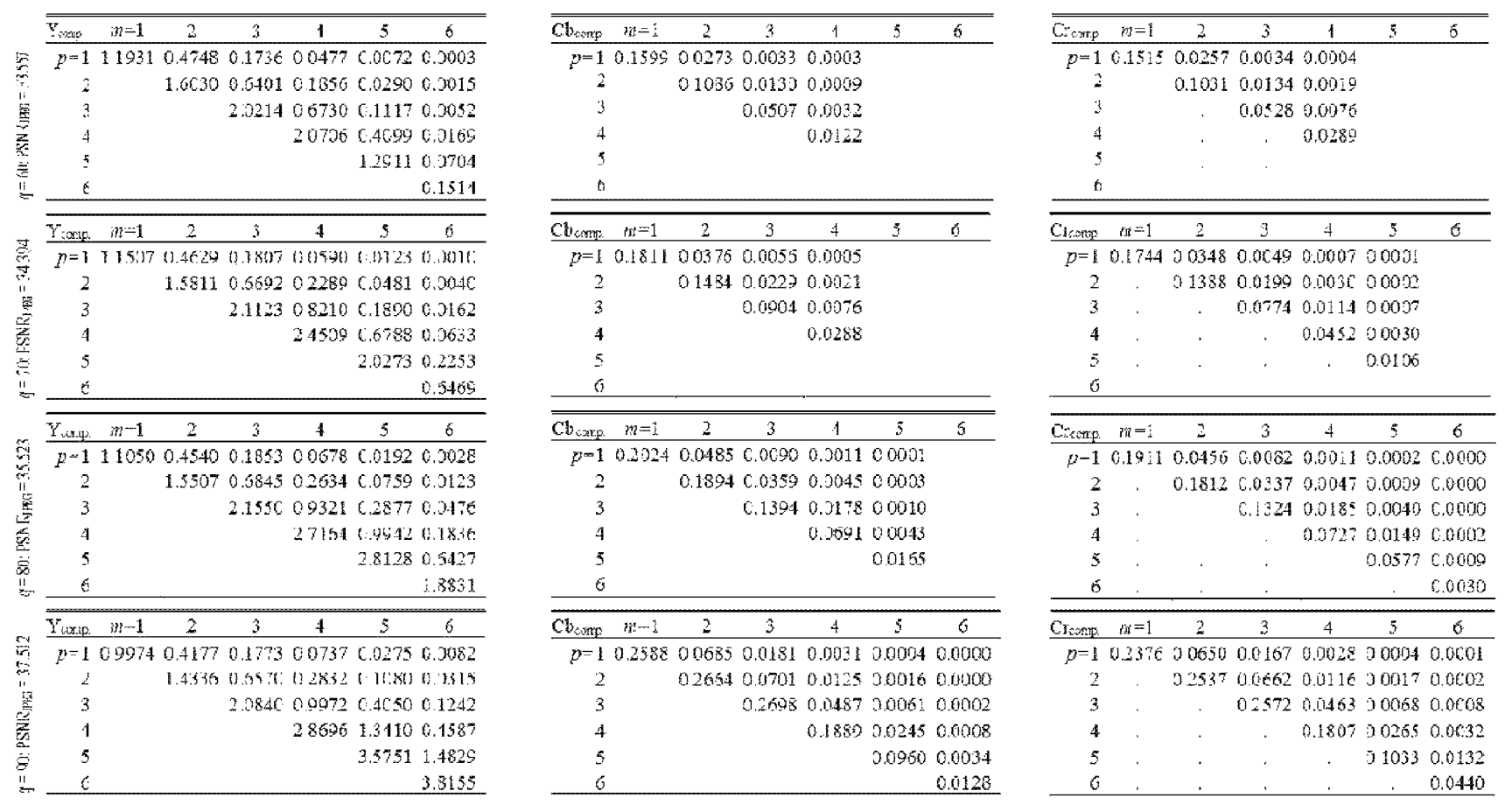

FIG. 5 illustrates tables containing second data suitable for use in determining the target bits for embedding the watermark according to an embodiment of the present disclosure.

FIG. 6 illustrates tables containing third data suitable for use in determining the target bits for embedding the watermark according to an embodiment of the present disclosure.

The first through third data shown in FIGS. 4-6 resulted from experiments performed based on ten sample images captured by scanners, mobile phones, digital cameras, camcorders, and the like in various indoor and outdoor places. However, those having ordinary skills in the art will understand that the use of the other images may result in the same conclusion.

The experimental process performed to determine the target bits according to the embodiment of the present disclosure includes a total of four operations, which will now be described in detail. However, the operations described below are divided for convenience of description, and the present disclosure is not limited thereto.

In a first operation, the JPEG encoding is performed on an original raw image according to a chroma subsampling type and the Q-factor to obtain the JPEG image. The color space of the original JPEG image is converted into the RGB space. Afterwards, a peak signal-to-noise ratio (PSNR) value between the original raw image and the original JPEG image is calculated.

FIG. 4 may represent a case where the chroma subsampling type has a ratio of 4:4:4, FIG. 5 may represent a case where the chroma subsampling type has a ratio of 4:2:2, and FIG. 6 may represent a case where the chroma subsampling type has a ratio of 4:2:0. In other words, the first data may represent the case where the chroma subsampling type has a ratio of 4:4:4, the second data may represent the case where the chroma subsampling type has a ratio of 4:2:2, and the third data may represent the case where the chroma subsampling type has a ratio of 4:2:0.

In FIGS. 4-6, three tables disposed in a first row may represent a case where the Q-factor is 60, and three tables disposed in a second row may represent a case where the Q factor is 70. Three tables disposed in a first row may represent a case where the Q factor is 80, and three tables disposed in a first row may represent a case where the Q factor is 90.

The PSNR value calculated in this operation may be denoted by $PSNR_{JPEG}$. The PSNR, which is widely used in image compression experiments, may be defined as an image quality index. Another objective image quality metric other than the PSNR such as structural similarity index measure (SSIM), visual information fidelity (VIF), mean relative squared error (MRSE)-based signal-to-noise (SNR), weighted spherical-peak signal-to-noise ratio (WS-PSNR), and high dynamic range-visual difference predictor (HDR-VDP) may be used as well. However, the present disclosure is not limited thereto.

In a second operation, a coefficient $\hat{C}_f(k)$ having an absolute value greater than or equal to $2^m$ is selected.

Here, 'm' may be an integer greater than or equal to one and less than or equal to six, as shown in FIGS. 4 to 6.

In a third operation, p-th least-significant-bits in all selected coefficients are flipped, and a flipped JPEG image is stored in a storage. The color space of the flipped JPEG image is converted into the RGB space. Afterwards, the PSNR value between the original raw image and the flipped JPEG image is calculated.

The PSNR value calculated in this operation may be denoted by $PSNR_{F\text{-}JPEG}$. Here, 'p' may be an integer greater than or equal to one and less than or equal to 'm'.

In a fourth operation, differences between $PSNR_{JPEG}$ and $PSNR_{F\text{-}JPEG}$ are calculated for various conditions to compare the decreases in the PSNR with each other.

Here, the difference may refer to a value of $PSNR_{JPEG}$-$PSNR_{F\text{-}NEG}$.

FIGS. 4-6 show data resulted from the above four operations. Thus, the tables may represent changes in the PSNR in terms of the difference between $PSNR_{JPEG}$ and $PSNR_{F\text{-}JPEG}$ according to the chroma sub sampling type and the Q-factor.

Referring to FIGS. 4-6, the change in the PSNR is almost dependent on the Q-factor and the chroma subsampling type. The independencies of the change in the PSNR on the Cb component and of the Cr component may be much similar to each other. However, the independency of the change in the PSNR on the Y component may be different from the independencies on the Cb and Cr components.

In another embodiment of the present disclosure, a JPEG image to which random noise is added may be used instead of the flipped JPEG image.

A method of determining the watermark-embedding table (WET) indicating the target bits according to data will now be described with reference to FIG. 7.

FIG. 7 is a table showing the target bits for embedding the watermark in a bit plane of the DCT coefficients determined based on the first through third data according to an embodiment of the present disclosure.

Due to the increasing 'p' and the independency from other color components, an allowable minimum value of 'm', the Q-factor, and the chroma subsampling type for the p-th bit plane may be determined based on the experimental data of FIGS. 4-6.

Thus, the value of 'm' for the p-th bit plane may be set, with reference to FIGS. 4-6, such that the PSNR difference for the Y component is less than 0.25 dB and the PSNR difference for the chroma component is less than 0.1 dB.

Referring to FIG. 7, if the target bits are determined as above, the value of 'm' in a 1-st bit plane for the Y component may be 3, 4, 5, or 6, the value of 'm' in a 2-nd bit plane may be 5 or 6, and the value of 'm' in a 3-rd bit plane may be 6. For the Cb and Cr components, the value of 'm' in the 1-st bit plane may be 3, 4, 5, or 6, the value of 'm' in the 2-nd bit plane may be 4, 5, or 6, the value of 'm' in the 3-rd bit plane may be 5 or 6, and the value of 'm' in a 4-th bit plane may be 6.

The table shown in FIG. 7 may be referred to as the watermark-embedding table (WET).

The original JPEG image and the flipped JPEG image acquired as above were compared visually, but no visual difference was detected even in the images enlarged by eight times the magnification of which is comparable to the PSNR difference.

Figure 8:
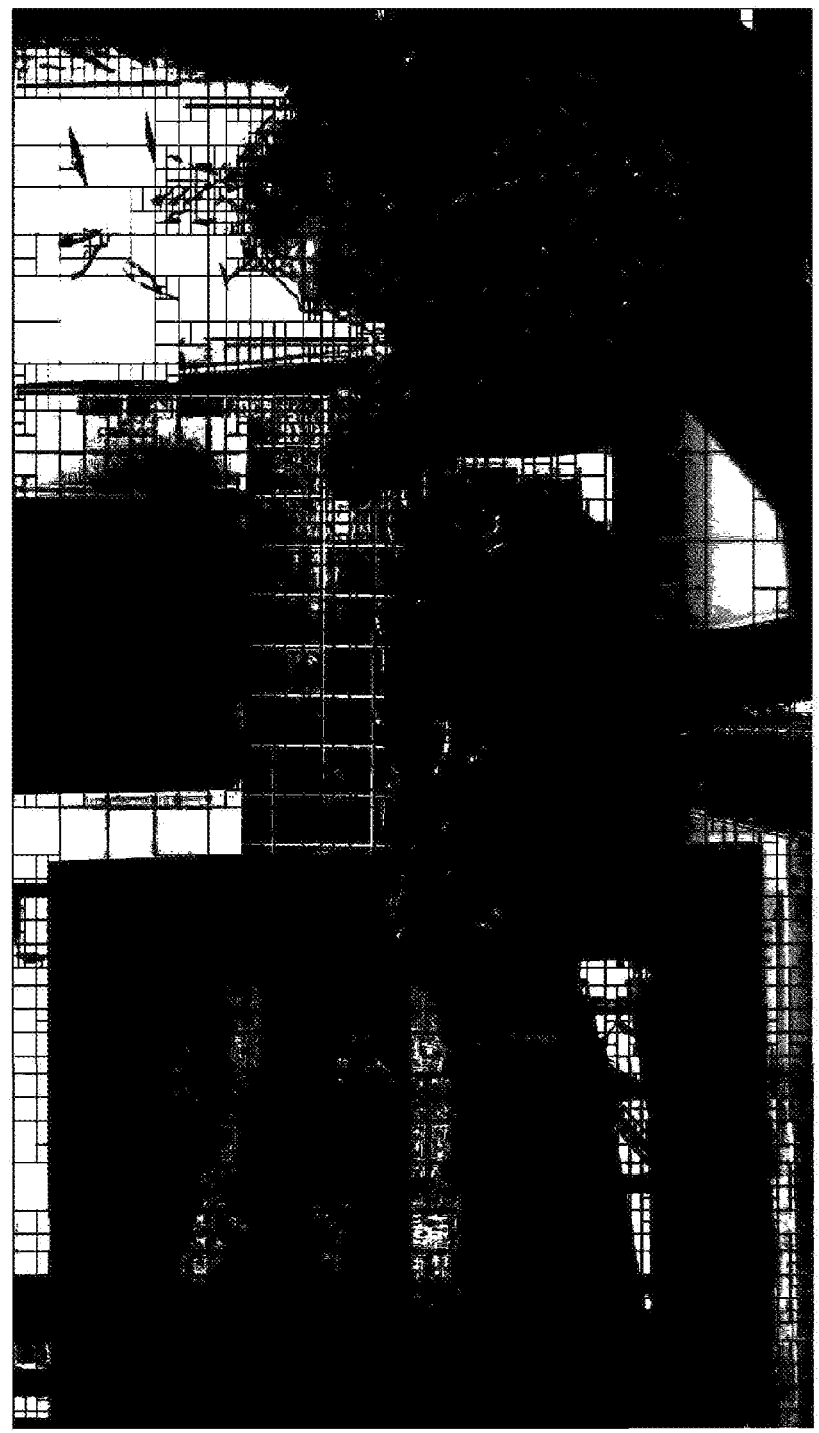
FIG. 8 shows a result of partitioning a sample image into blocks according to an embodiment of the present disclosure.

FIG. 8 shows a result of partitioning the sample image into blocks according to an embodiment of the present disclosure.

According to an embodiment of the present disclosure, the partitioning may include three operations. However, the operations described herein are divided for convenience of description, the present disclosure is not limited thereto.

In a first operation, all block sets are allocated to a mother GOB which is a root GOB.

In a second operation, a longer side is selected from a horizontal side and a vertical side for each mother GOB, and each mother GOB is divided into two equally-wide child GOBs in a direction perpendicular to the selected side.

In the case that the length or number of pixels of the GOB in the selected direction is an odd number, the partitioning may be performed such that the length of the left or upper child GOB is smaller than the length of the right or lower child GOB, and vice versa. Referring to FIG. 8, the resultant child GOB may have a rectangular shape or a square shape.

Each of the child GOBs may be declared as a mother GOB again and may be divided again into child GOBs having a preset Tb or more target bits. However, in case that the child GOB cannot be divided into the child GOBs having the preset Tb or more target bits, the child GOB may not be declared as a mother GOB and may not be divided into the child GOBs.

In a third operation, the second operation described above is repeatedly carried out until no mother GOB is present any more. In other words, each child GOB may be partitioned as long as the child GOB can be partitioned into its child GOB including the preset Tb or more target bits. When the third operation is competed, there remains only child GOBs each having the preset Tb or more target bits. Here, the branch chain from the root GOB (i.e., the first mother GOB) to the last child GOBs may be stored.

The detection fineness factor Tb according to the embodiment of the present disclosure may determine the number of bits of the watermark that may be embedded. In other words, the larger the Tb value is, the bigger the number of bits of the watermark is. Therefore, the size of each GOB and the size of the watermark embedded in the GOB may increase with the Tb value.

More specifically, if the detection fineness factor Tb is large, a large sized GOB may be generated so that localization of the modified region may be performed somewhat roughly or not densely. In such a case, however, the large sized GOB allows embedding of a large sized watermark, which may reduce a detection failure rate. Therefore, the Tb value may cause a trade-off relationship between security and localization fineness.

Figure 9:
FIG. 9 comparatively shows JPEG images acquired by quantizing and compressing sample images by a quality factor (Q-factor) of 60 along with watermarked images thereof according to an embodiment of the present disclosure.

FIG. 9 comparatively shows JPEG images acquired by quantizing and compressing sample images by the Q-factor of 60 along with watermarked images thereof according to an embodiment of the present disclosure.

Figure 10:
FIG. 10 comparatively shows JPEG images acquired by quantizing and compressing the sample images by the Q-factor of 90 along with watermarked images thereof according to an embodiment of the present disclosure.

FIG. 10 comparatively shows JPEG images acquired by quantizing and compressing the sample images by the Q-factor of 90 along with watermarked images thereof according to an embodiment of the present disclosure.

Referring to FIGS. 9 and 10, it is difficult to visually detect the difference between the JPEG images compressed under the Q factor of 60 and 90 and their watermarked images, and thus the difference can be ignored.

Those having ordinary skills in the art would understand that it would be difficult to visually detect the difference between the JPEG images and their watermarked images when the Q factor is between 60 and 90 also.

FIG. 11 is a table summarizing results of detecting tampered regions from a watermarked image according to an embodiment of the present disclosure Referring to FIG. 11, the tampered regions detected by the device 300 for verifying integrity of the image may differ depending on tampering types.

When the device 300 for verifying integrity of the image determines that a metadata modification, enlargement, reduction, resizing, cutting, recompression, sharpening, enhancement, or blur removal occurred in the JPEG image, the device 300 for verifying integrity of the image may detect an entire region of the image as the tampered region. When the device 300 for verifying integrity of the image determines that a copy and move, regional copying, stitching, block exchange, or collage attack occurred, the device 300 for verifying integrity of the image may detect only a corresponding region as the tampered region.

However, the above description is no more than examples of the tampered regions detected by the device for verifying integrity of the image according to the embodiment of the present disclosure, and the present disclosure is not limited thereto.

Figure 12:
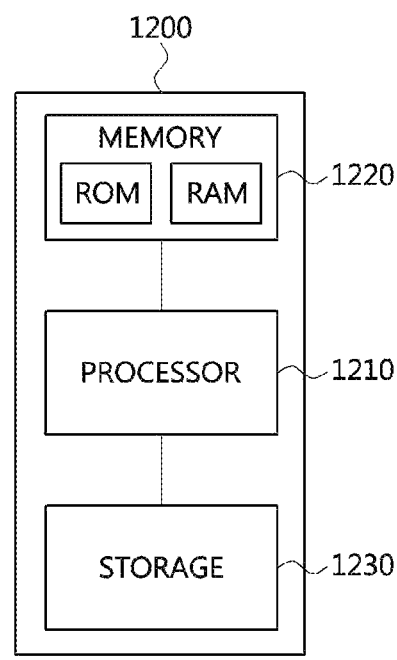
FIG. 12 is a block diagram of a watermark embedding device according to another embodiment of the present disclosure.

FIG. 12 is a block diagram of the watermark embedding device according to another embodiment of the present disclosure.

Referring to FIG. 12, the watermark embedding device 1200 according to the embodiment may include at least one processor 1210, a memory 1220, and a storage 1230.

The processor 1210 may execute program commands or instructions stored in the memory 1220 and/or the storage 1230. The processor 1210 may be a central processing unit (CPU), a graphics processing unit (GPU), or a dedicated processor suitable for performing the methods of the present disclosure. The memory 1220 and the storage 1230 may include a volatile storage medium and/or a non-volatile storage medium. For example, the memory 1220 may include a read-only memory (ROM) and/or a random access memory (RAM).

The memory 1220 may store at least one instruction to be executed by the processor 1210. The at least one instruction may include an instruction for performing entropy decoding on the JPEG image to generate the quantized DCT coefficients, an instruction for determining the target bits in a bit plane of the quantized DCT coefficients on the basis of the WET, and an instruction for embedding the watermark in the target bits based on the metadata of the JPEG image.

Also, the at least one instruction may further include an instruction for determining the WET on the basis of the PSNR values between the original raw image of the sample and the JPEG image of the sample, and between the original raw image of the sample and the flipped JPEG image of the sample or the JPEG image of the sample to which the random noise is added.

Further, the at least one instruction may further include an instruction for determining the WET on the basis of the objective image quality metrics between the original raw image of the sample and the JPEG image of the sample and between the original raw image of the sample and the flipped JPEG image of the sample or the JPEG image of the sample to which the random noise is added. The objective image quality metric may be calculated using at least one of the SSIM, VIF, MRSE-based SNR, WS-PSNR, and HDR-VDP.

The instruction for determining the WET may include an instruction for calculating a first PSNR value between the original raw image of the sample and the JPEG image of the sample, an instruction for calculating a second PSNR value between the original raw image of the sample and the flipped JPEG image of the sample or the JPEG image of the sample to which the random noise is added, an instruction for calculating a difference between the first PSNR value and the second PSNR value, and an instruction for determining the WET on the basis of the difference and the second PSNR value. The instruction for determining the WET may further include an instruction for selecting at least one DCT coefficient on the basis of absolute values of the quantized DCT coefficients and generating the flipped JPEG image of the sample or the JPEG image of the sample to which the random noise is added.

The at least one instruction may further include an instruction for generating a plurality of GOBs having a tree structure and including the target bits on the basis of a plurality of blocks including the quantized DCT coefficients.

Here, the instruction for generating the plurality of GOBs having the tree structure may include an instruction for setting the plurality of blocks as one mother GOB, an instruction for dividing the mother GOB into a plurality of the child GOBs under a condition that at least one child GOB includes a preset number or more of target bits, and an instruction for generating the branch chain information from the mother GOB to the child GOBs for each child GOB.

Here, the instruction for embedding the watermark based on the metadata of the JPEG image in the target bits may include an instruction for generating the BIK for each child GOB on the basis of the child GOB information including information about bits that are not included in the target bits of the child GOBs and the branch chain information of the child GOB, the metadata of the JPEG image, and a user key, an instruction for generating the RBS for each child GOB on the basis of the BIK for each child GOB, and an instruction for embedding the RBS for each child GOB in the target bits of the GOB.

Here, the child GOB information may further include information about bits that are not included in the target bits of a neighboring GOB of the child GOB, and branch chain information of the neighboring GOB of the child GOB.

The device for verifying integrity of the image according to the embodiment of the present disclosure may include at least one processor, a memory, and a storage similarly to the watermark embedding device 1200.

The processor of the device for verifying integrity of the image may execute program commands or instructions stored in the memory and/or the storage. The processor may be a CPU, a GPU, or a dedicated processor suitable for performing the methods of the present disclosure. The memory and the storage may include a volatile storage medium and/or a non-volatile storage medium. For example, the memory may include a read-only memory (ROM) and/or a random access memory (RAM).

The memory of the device for verifying the integrity of the image may store at least one instruction to be executed by the processor. The at least one instruction may include an instruction for performing entropy decoding on a plurality of blocks in a JPEG image to generate quantized DCT coefficients, an instruction for determining the target bits in a bit plane of the quantized DCT coefficients on the basis of the WET, an instruction for extracting a first watermark from the target bits, an instruction for generating a second watermark on the basis of metadata of the JPEG image, and an instruction for comparing the first watermark with the second watermark to verify the integrity of the image.

The at least one instruction may further include an instruction for generating a plurality of GOBs having the tree structure and including the target bits on the basis of the plurality of blocks.

Here, the instruction for generating the plurality of GOBs having the tree structure may include an instruction for setting the plurality of blocks as one mother GOB, an instruction for dividing the mother GOB into a plurality of the child GOBs under a condition that at least one child GOB includes a preset number or more of target bits, and an instruction for generating the branch chain information from the mother GOB to the child GOBs for each child GOB.

The instruction for extracting the first watermark from the target bits may include an instruction for extracting the first watermark from the target bits for each child GOB.

The instruction for generating the second watermark based on the metadata of the JPEG image may include an instruction for generating the BIK for each child GOB on the basis of the child GOB information including the information about bits that are not included in the target bits of the child GOBs and the branch chain information of the child GOB, the metadata of the JPEG image, and the user key, and an instruction for generating the RBS, which is the second watermark, for each child GOB on the basis of the BIK for each child GOB.

The instruction for comparing the first watermark with the second watermark to verify the integrity of the image may include an instruction for determining the JPEG image as having been unaltered when the first watermark for the child GOB is the same as the second watermark for the child GOB for all the child GOBs, and an instruction for determining the JPEG image as having been altered when the first watermark for the child GOB is not the same as the second watermark for the child GOB for any of the child GOBs.

The instruction for determining the JPEG image as having been altered may further include an instruction for determining the child GOB of which the first watermark and the second watermark are not the same as each other as an altered region.

Figure 13:
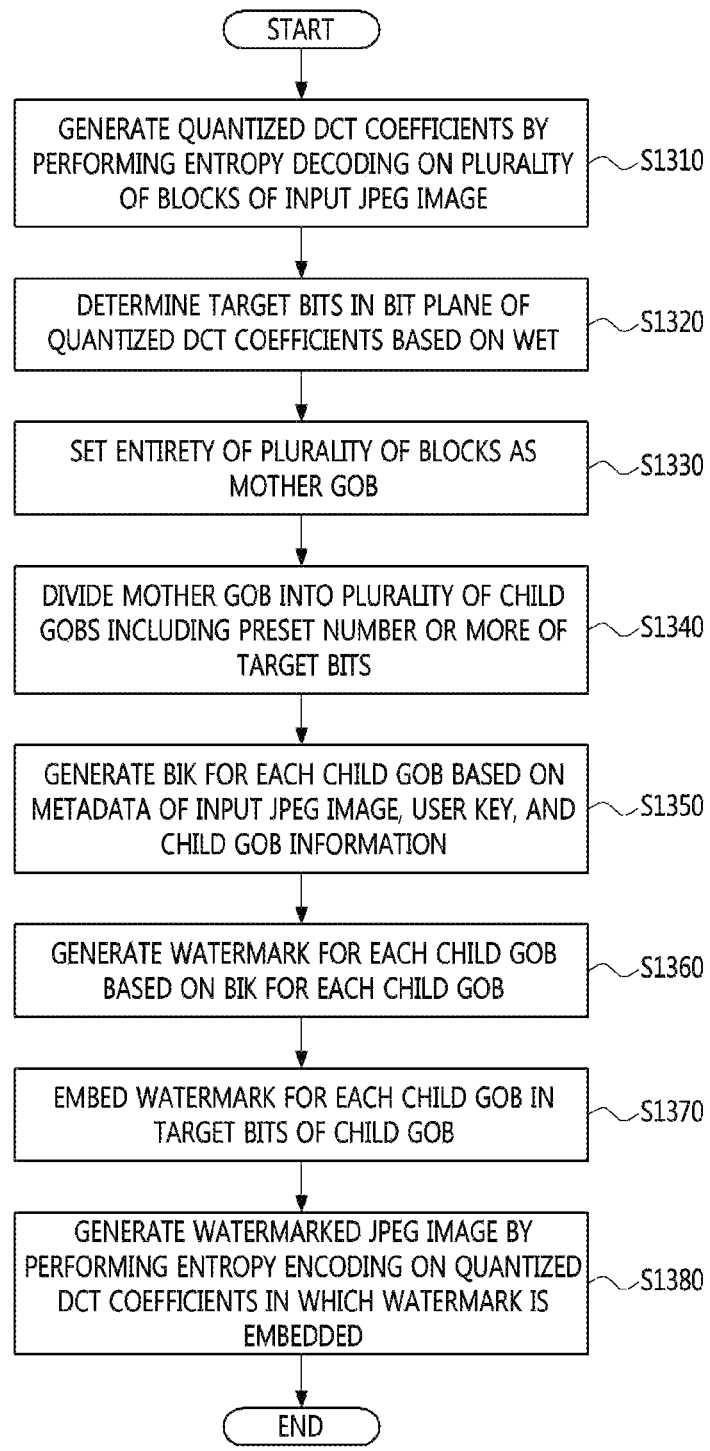
FIG. 13 is a flowchart illustrating a method of embedding the watermark according to an embodiment of the present disclosure.

FIG. 13 is a flowchart illustrating a method of embedding the watermark according to an embodiment of the present disclosure.

Referring to FIG. 13, the watermark embedding device according to the present embodiment may perform the entropy decoding on a plurality of blocks of an input JPEG image to generate the quantized DCT coefficients (S1310) and determine the target bits in a bit plane of the quantized DCT coefficients on the basis of the WET (S1320). Here, the target bits may refer to bits into which the watermark may be embedded.

The watermark embedding device may set an entirety of a plurality of blocks as a mother GOB (S1330) and divide the mother GOB into a plurality of child GOBs including a preset number or more of target bits (S1340). The child GOB may be divided into a plurality of GOBs including a preset number or more of target bits, if possible. In such a case, the partitioning may be performed after setting the child GOB as the mother GOB.

The watermark embedding device may generate the BIK for each child GOB on the basis of the metadata of the input JPEG image, the user key, and the child GOB information (S1350). Here, the child GOB information may include information about all bits in the GOB except the target bits, and the information of the branch chain from the mother GOB (i.e., root GOB) to the GOB. Further, the watermark embedding device may use a hash function to generate the BIK.

The watermark embedding device may generate the watermark for each child GOB on the basis of the BIK for each child GOB (S1360) and embed the watermark for each child GOB in the target bits of the child GOB (S1370). Here, the watermark may refer to the RBS generated based on the BIK.

After embedding all the watermarks for the child GOBs, the watermark embedding device may generate the watermarked JPEG image by performing the entropy encoding on the quantized DCT coefficients in which the watermark is embedded (S1380).

Figure 14:
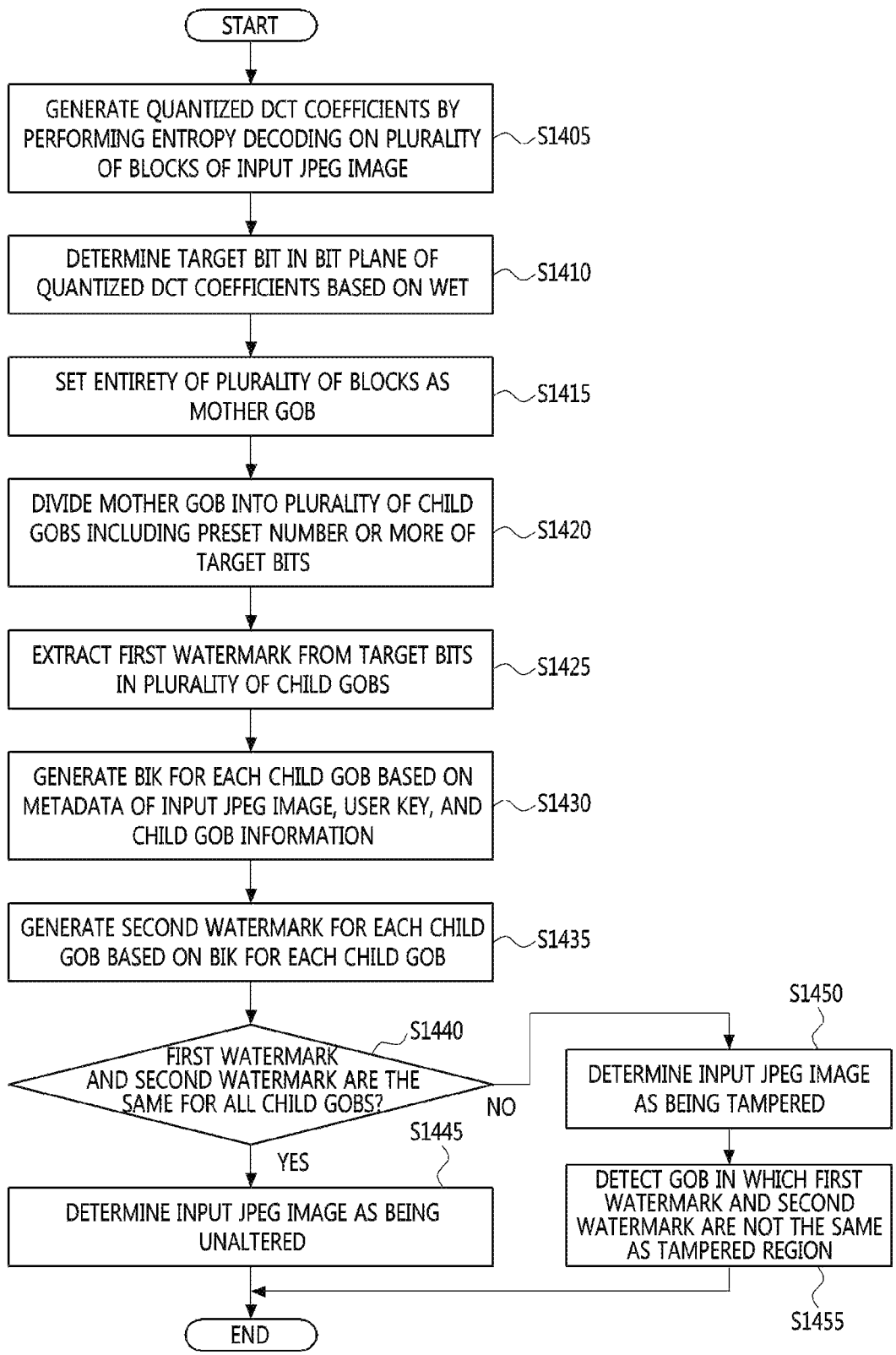
FIG. 14 is a flowchart illustrating a method of verifying integrity of an image based on the watermark according to an embodiment of the present disclosure.

FIG. 14 is a flowchart illustrating a method of verifying the integrity of the image based on the watermark according to an embodiment of the present disclosure.

Referring to FIG. 14, operations S1405 through S1420 performed by the device for verifying the integrity of an image may be the same as the operations S1310 through S1340 performed by the watermark embedding device and described with reference to FIG. 13.

After such operations, the device for verifying the integrity of the image may extract the first watermark from the target bits in the plurality of child GOBs (S1425). Here, the first watermark may refer to the RBS embedded by the watermark embedding device and may be extracted from each of the child GOBs.

The device for verifying the integrity of the image may generate the BIK for each child GOB on the basis of the metadata of the input JPEG image, the user key, and the child GOB information (S1430). Here, the child GOB information may include the information about all bits in the GOB except the target bits, and the information of the branch chain from the mother GOB (i.e., root GOB) to the GOB. Further, the watermark embedding device may use a hash function to generate the BIK.

The device for verifying the integrity of the image may generate the second watermark for each child GOB on the basis of the BIK for each child GOB (S1435) and determine whether the first watermark and the second watermark are the same as each other for all of the child GOBs (S1440).

When the first watermark and the second watermark are the same as each other for all the child GOBs, the device for verifying the integrity of the image may determine the input JPEG image as having been unaltered (S1445).

When the first watermark and the second watermark are not the same as each other for any of the child GOBs, however, the device for verifying the integrity of the image may determine the input JPEG image as having been altered (S1450) and detect the GOB in which the first watermark and the second watermark are not the same as each other as an altered region in the input JPEG image (S1460).

The operations according to the embodiments of the present disclosure may be implemented as computer-readable programs or codes stored in a computer readable storage medium. The computer readable storage medium includes all types of recording devices that store data that can be read by a computer system. In addition, in the computer readable storage medium, programs or codes that are distributed over computer systems connected to each other via a network and that can be read by a computer in a distributed manner may be stored and executed.

Further, the computer readable storage medium may include hardware devices specially configured to store and execute program instructions, such as a ROM, a RAM, a flash memory, and the like. The program instructions may include not only machine language codes such as those produced by a compiler, but also high-level language codes that can be executed by the computer using an interpreter or the like.

While some aspects of the present disclosure have been described in the context of the device, it can also represent a description according to a corresponding method. Here, the block or the device corresponds to the method operation or the feature of the method operation. Similarly, aspects described in the context of the method can also be represented by a corresponding block or item or the feature of a corresponding device. Some or all operations of the method may be performed by or using a hardware device such as, for example, a microprocessor, a programmable computer, or electronic circuit. In some embodiments, one or more of the most important method operations may be performed by such a device.

In some embodiments, a programmable logic device (e.g., a field programmable gate array) may be used to perform some or all of the functionality of the methods described herein. In some embodiments, the field programmable gate array may be operated with a microprocessor for performing one of the methods described herein. Generally, the methods are preferably performed by some hardware devices.

While the embodiments of the present disclosure and their advantages have been described above in detail, it should be understood that various changes, substitutions and alterations may be made herein without departing from the scope of the present disclosure as defined by the following claims.

What is claimed is:

1. A method of embedding a watermark in a Joint Photographic Experts Group (JPEG) image for verifying integrity of the JPEG image, the method comprising:
    performing an entropy decoding on the JPEG image to generate quantized discrete cosine transform (DCT) coefficients;
    determining target bits in a bit plane of the quantized DCT coefficients according to a predetermined rule and generating a plurality of groups of blocks (GOBs) having a tree structure based on a plurality of blocks in the bit plane such that each child GOB includes at least one target bit; and
    embedding a watermark based on metadata of the JPEG image in the target bits,
    wherein embedding the watermark based on the metadata of the JPEG image in the target bits comprises:
    generating a block identifying key (BIK) for each child GOB on the basis of child GOB information comprising information about bits that are not included in the target bits in the child GOBs and the branch chain information of the child GOB, the metadata of the JPEG image; and a user key;
    generating a random bit sequence (RBS) for each child GOB on the basis of the BIK for each child GOB; and
    embedding the RBS for each child GOB in the target bits of the GOB.

2. The method of claim 1, further comprising:
    determining a watermark-embedding table (WET) on the basis of a peak signal-to-noise ratio (PSNR) value between a raw image of a sample and a JPEG image of the sample and a PSNR value between the raw image of the sample and a flipped JPEG image of the sample or a JPEG image of the sample to which random noise is added.

3. The method of claim 2, wherein determining the WET comprises:
    calculating a first PSNR value between the raw image of the sample and the JPEG image of the sample;
    calculating a second PSNR value between the raw image of the sample and the flipped JPEG image of the sample or the JPEG image of the sample to which the random noise is added;
    calculating a difference between the first PSNR value and the second PSNR value; and
    determining the WET on the basis of the difference and the second PSNR value.

4. The method of claim 3, wherein determining the WET further comprises:
    selecting at least one of the DCT coefficients on the basis of absolute values of the quantized DCT coefficients to generate the flipped JPEG image of the sample or the JPEG image of the sample to which the random noise is added.

5. The method of claim 1, further comprising:
    determining a watermark-embedding table (WET) on the basis of an objective image quality metric between a raw image of a sample and a JPEG image of the sample and an objective image quality metric between the raw image of the sample and a flipped JPEG image of the sample or a JPEG image of the sample to which random noise is added.

6. The method of claim 5, wherein the objective image quality metric is calculated using at least one of structural similarity index measure (SSIM), Visual Information Fidelity (VIF), mean relative squared error (MRSE)-based signal-to-noise (SNR), weighted spherical-peak signal-to-noise ratio (WS-PSNR), and high dynamic range-visual difference predictor (HDR-VDP).

7. The method of claim 1, wherein generating the plurality of GOBs comprises:
    setting the plurality of blocks as a mother GOB;
    dividing the mother GOB into a plurality of child GOBs as long as one child GOB includes a preset number or more of target bits; and
    generating branch chain information for each child GOB from the mother GOB to the child GOB.

8. The method of claim 1, wherein the child GOB information further comprises:
    information about bits that are not included in target bits in a neighboring GOB of the child GOB; and
    branch chain information of the neighboring GOB of the child GOB.

9. A method of verifying integrity of a Joint Photographic Experts Group (JPEG) image in which a watermark is embedded, the method comprising:
    performing an entropy decoding on the JPEG image to generate quantized discrete cosine transform (DCT) coefficients;
    determining target bits in a bit plane of the quantized DCT coefficients according to a predetermined rule and generating a plurality of groups of blocks (GOBs) having a tree structure based on a plurality of blocks in the bit plane such that each child GOB includes at least one target bit;
    extracting a first watermark from the target bits;
    generating a block identifying key (BIK) for each child GOB on the basis of the child GOB information including information about bits that are not included in the target bits in the child GOBs and the branch chain information of the child GOB, the metadata of the PEG image, and a user key, and generating a random bit sequence (RBS) for each child GOB on the basis of the BIK for each child GOB as a second watermark; and comparing the first watermark with the second watermark to verify the integrity of the image.

10. The method of claim 9, wherein generating the plurality of GOBs having the tree structure and including the target bits on the basis of the plurality of blocks comprises:

setting the plurality of blocks as a mother GOB;

dividing the mother GOB into a plurality of child GOBs as long as one child GOB includes a preset number or more of target bits; and generating branch chain information for each child GOB from the mother GOB to the child GOB.

11. The method of claim 10, wherein extracting the first watermark from the target bits comprises:

extracting the first watermark from the target bits for each child GOB.

12. The method of claim 9, wherein comparing the first watermark with the second watermark to verify the integrity of the image comprises:

determining the JPEG image as having been unaltered when the first watermark for the child GOB is the same as the second watermark for the child GOB for all the child GOBs; and determining the JPEG image as having been altered when the first watermark for the child GOB is not the same as the second watermark for the child GOB for any of the child GOBs.

13. The method of claim 12, wherein determining the JPEG image as having been altered further comprises:

determining the child GOB of which the first watermark is not the same as the second watermark as an altered region.

14. A device for embedding a watermark in a Joint Photographic Experts Group (JPEG) image for verifying integrity of the JPEG image, comprising:

a processor; and a memory storing at least one instruction to be executed by the processor, wherein the at least one instruction when executed by the processor causes the processor to:

perform an entropy decoding on the JPEG image to generate quantized discrete cosine transform (DCT) coefficients;

determine target bits in a bit plane of the quantized DCT coefficients according to a predetermined rule and generate a plurality of croups of blocks (GOBs) having a tree structure based on a plurality of blocks in the bit plane such that each child GOB includes at least one target bit; and embed a watermark based on metadata of the JPEG image in the target bits, wherein the at least one instruction causing the processor to embed the watermark based on the metadata of the JPEG image in the target bits causes the processor to:

generate a block identifying key (BIK) for each child GOB on the basis of child GOB information comprising information about bits that are not included in the target bits in the child GOBs and the branch chain information of the child GOB, the metadata of the JPEG image, and a user key;

generate a random bit sequence (RBS) for each child GOB on the basis of the BIK for each child GOB; and embed the RBS for each child GOB in the target bits of the GOB.

15. The device of claim 14, wherein the at least one instruction when executed by the processor further causes the processor to:

determine a watermark-embedding table (WET) on the basis of a peak signal-to-noise ratio (PSNR) value between a raw image of a sample and a JPEG image of the sample and a PSNR value between the raw image of the sample and a flipped JPEG image of the sample or a JPEG image of the sample to which random noise is added.

16. The device of claim 15, wherein the at least one instruction when executed by the processor further causes the processor to:

determine a watermark-embedding table (WET) on the basis of an objective image quality metric between a raw image of a sample and a JPEG image of the sample and an objective image quality metric between the raw image of the sample and a flipped JPEG image of the sample or a JPEG image of the sample to which random noise is added.

* * * * *